United States Patent [19]

Juso et al.

[11] Patent Number: 4,623,941

[45] Date of Patent: Nov. 18, 1986

[54] PCM TYPE RECORD-PLAYBACK SYSTEM

[75] Inventors: Hiromi Juso, Gose; Kengo Sudoh; Yukihiko Haikawa, both of Higashihiroshima, all of Japan

[73] Assignee: Sharp Kabushiki Kaisha, Osaka, Japan

[21] Appl. No.: 744,125

[22] Filed: Jun. 12, 1985

[51] Int. Cl.⁴ .......................... G11B 5/00; G11B 5/02; G11B 15/18
[52] U.S. Cl. ........................................ 360/18; 360/8; 360/72.2
[58] Field of Search ...................... 360/72.2, 8, 49, 48, 360/18

[56] References Cited

U.S. PATENT DOCUMENTS 3,921,209  11/1975  Yoshino et al. ........................ 360/8
4,541,021   9/1985  Konishi et al. ..................... 360/72.2
4,544,958  10/1985  Odaka ..................................... 360/8

Primary Examiner—Vincent P. Canney
Attorney, Agent, or Firm—Flehr, Hohbach, Test, Albritton & Herbert

[57] ABSTRACT

A PCM type record-playback system converts an analog primary signal into a digital signal by sampling and quantizing it and concurrently records it on a magnetic tape with a secondary signal for showing the tape position. The primary and secondary signals are recorded on the same track in a time-divided manner so that recording can be effected with a small number of magnetic heads and the tracks on the magnetic tape can be effectively utilized.

6 Claims, 4 Drawing Figures

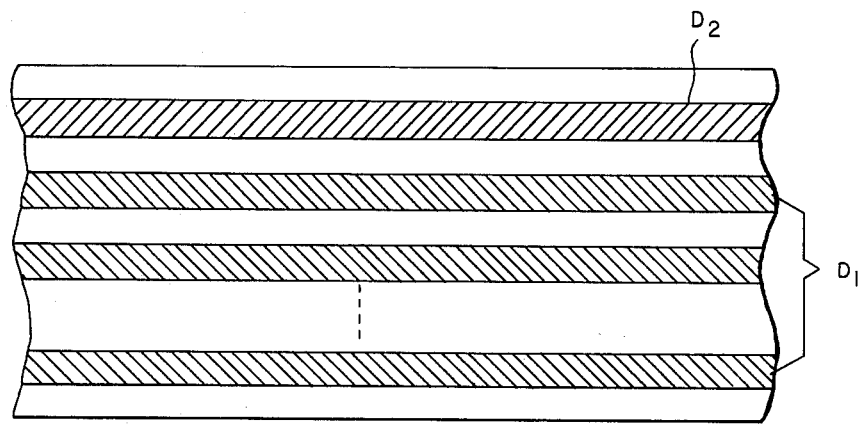
PRIOR ART
FIG.—1
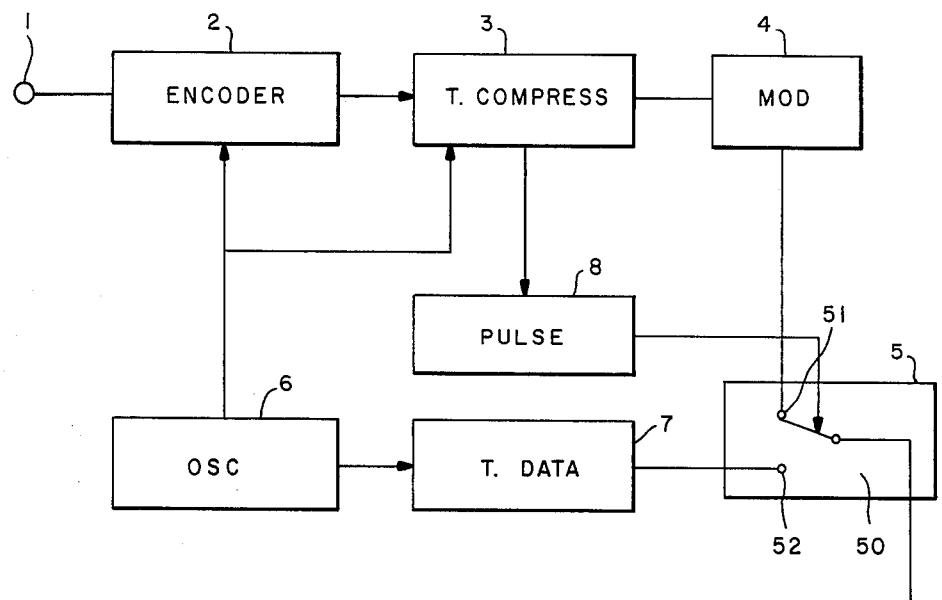
FIG.—2
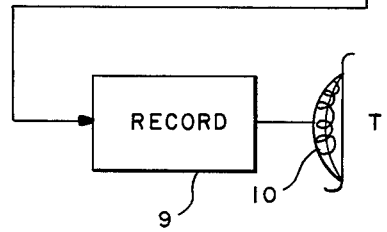

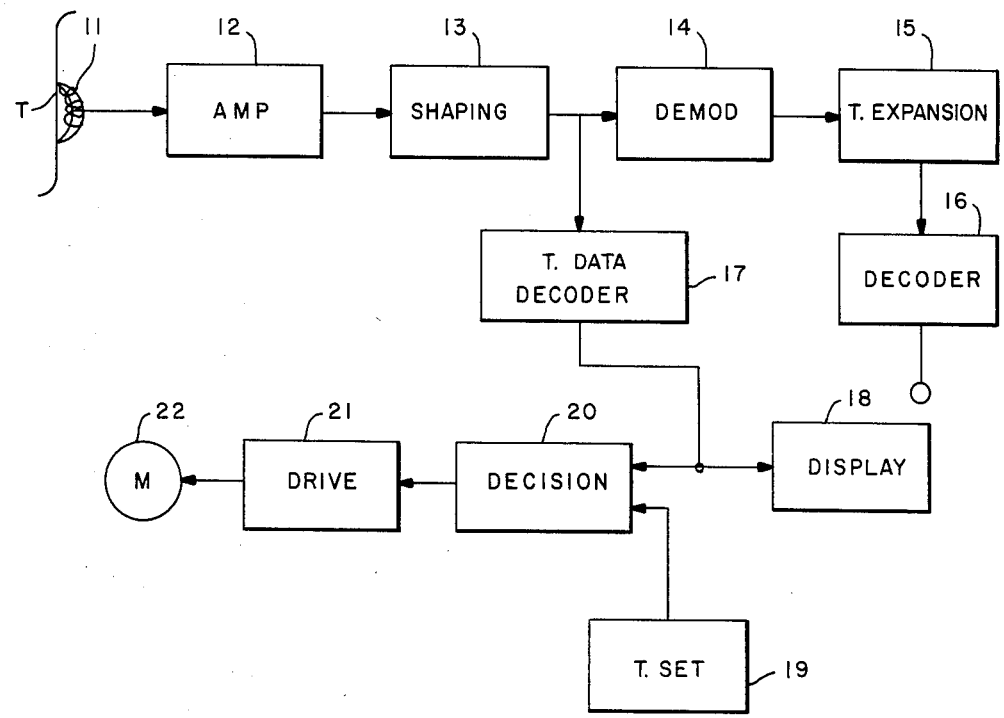
FIG.—3
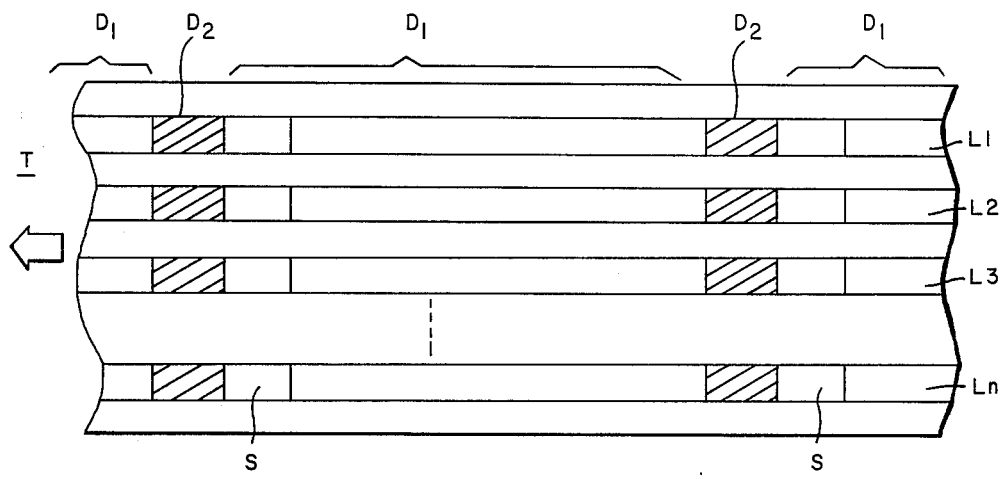
FIG.—4

PCM TYPE RECORD-PLAYBACK SYSTEM

This invention relates to a PCM (pulse coded modulation) type record-playback system for recording analog signals such as audio and video signals on a magnetic tape by converting them into a digital signal.

In general, a record-playback system of this type records not only a digitized primary signal from an analog signal such as an audio signal or a video signal but also a secondary signal which indicates the absolute position on the tape and is used for high-speed information retrieval. Conventional recording systems record primary and secondary signals $D_1$ and $D_2$ on different tracks as shown in FIG. 1. Accordingly, such a conventional format requires a large number of magnetic heads and a complicated electric circuit. Moreover, the number of tracks on the magnetic tape increases and this makes it necessary to accurately define the positional relationship between the magnetic tape and the magnetic head.

It is therefore an object of the present invention in view of the above to provide a system which can record information without increasing the number of tracks or lowering recording efficiency by recording both primary and secondary signals on the same track according to a time-division format with fixed time intervals.

The above and other objects of the present invention are achieved by providing a new PCM-type record-playback system which records not only an analog primary signal by sampling and quantizing to convert it into a digital signal but also a secondary signal showing the magnetic tape position. This new system comprises a digital encoder circuit for digitizing the primary signal, a blanking period generation circuit for creating blanking periods in the digitized primary signal obtained from the digital encoder circuit, an oscillation circuit for generating reference clock signals, a secondary signal generation circuit for generating a secondary signal for showing the magnetic tape position on the basis of this reference clock, a signal synthesizing circuit means for inputting the primary signal sent from the blanking period generation circuit with blanking periods and the secondary signal sent from the secondary signal generation circuit and outputting them with the secondary signal inserted in the blanking periods of the primary signal, and a recording circuit for recording on the same track of a magnetic tape the signal obtained from the signal synthesizing means.

FIG. 1 is a schematic which shows a recording format on a magnetic tape recorded by a conventional record-playback system.

FIGS. 2 and 3 are block circuit diagrams respectively of the record and playback section of a record-playback system embodying the present invention.

FIG. 4 is a schematic which shows a recording format on a magnetic tape recorded by a system according to this system.

In FIG. 2 which represents the record section of a record-playback system of this invention, numeral 1 is an input terminal for inputting an analog signal such as an audio or video signal, that is, a primary signal which is not subjected to pulse coded modulation yet; numeral 2 is a digital encoder circuit which not only samples the primary signal by a predetermined sampling frequency but also quantizes it into a predetermined number of bits and carries out other processes such as adding an interleave, an error correction symbol, synchronization signal, etc.; numeral 3 is a time-axis compression circuit which serves as a blanking period generation circuit by temporally compressing the digitized (pulse code modulated) primary signal from the digital encoder circuit 2 to create blanking periods in the primary signal; and numeral 4 is a modulation circuit for modulating this temporally compressed primary signal with blanking periods into a waveform which is easy to record on a magnetic tape. The output from the modulation circuit 4 is inputted to a first input terminal 51 of a switch 50 in a time-division circuit 5. The transmission rate (or record density) of this digitized (pulse code modulated) primary signal outputted from the modulation circuit 4 is too high for a high-speed playback. Numeral 6 is an oscillation circuit for generating reference clock signals and its output, which is the reference clock, is supplied to a time data generation circuit 7, the digital encoder circuit 2 and the time-axis compression circuit 3.

The time data generation circuit 7 uses an internally stored counter to count the number of the reference clock signals and makes an output as a time data signal by latching at a predetermined time period. The time data signal is used for indicating a position on a magnetic tape T in terms of the current time and is intended to become a secondary signal for high-speed information retrieval. Only a small amount of information is sufficient if, for example, writing is effected on the magnetic tape at intervals of 10 milliseconds.

A switching pulse generation circuit 8 is controlled by the time-axis compression circuit 3, and is adapted to output a switch control signal for the time-division circuit 5 by controlling the switch 50. It connects the switch 50 to the first input terminal 51 when the time-axis compression circuit 3 is outputting a temporally compressed primary data signal and to a second input terminal 52 of the switch 50 during a blanking period when the time-axis compression circuit 3 is not outputting any primary data signal. Controlled by this switch control signal from the switching pulse generation circuit 8, the time-division circuit 5 inserts the secondary signals obtained from the time data generation circuit 7 individually into the blanking periods of the primary signal obtained from the modulation circuit 4. The signal, thus synthesized, is passed successively through a recording circuit 9 and a recording head 10 and is recorded on a magnetic tape T.

FIG. 4 shows an example of the recording format of the primary and secondary signals on the magnetic tape T when the recording system of FIG. 2 is used. On each of the tracks $L_1 \ldots L_n$, there are primary signals $D_1$, secondary signals $D_2$ and synchronization signals S recorded alternately in a time-divided form. In the above, the secondary signals $D_2$ are recorded with a recording density which is sufficiently low so that high-speed playback is possible. Accordingly, both primary and secondary signals are reproduced in the case of a normal-speed playback but only the secondary signals are reproduced in the case of a high-speed playback.

FIG. 3 is a block diagram of a playback circuit according to the present invention. Numeral 11 is a playback head; numeral 12 is a playback amplifier for amplifying the primary and secondary signals $D_1$ and $D_2$ picked up by the playback head 11; and numeral 13 is a waveform shaping circuit for receiving the primary and secondary signals from the playback amplifier 12 and outputting them by shaping them into digital signals necessary for their demodulation. The portions of the signal obtained from the waveform shaping circuit 13 corresponding to the primary signal are subjected in a next stage to a process which is the reverse of the one at the time of recording. In other words, the primary signals are demodulated by a demodulation circuit 14 and temporally expanded by a time-axis expansion circuit 15. Errors are corrected in a digital decoder circuit 16; D/A conversion is effected and the original analog signal is reproduced.

The portions of the signal obtained from the waveform shaping circuit 13 corresponding to the secondary signal, on the other hand, are read by a time data decoder 17 and time-displayed by a display circuit 18 as the time of the current position (current time) of the magnetic tape. Numeral 19 is a time setting circuit. When a keyboard (not shown) is operated to set a time for stopping the magnetic tape T or a time corresponding to a predetermined position where normal-speed playback should start, the time setting circuit 19 outputs a corresponding set time datum.

Numeral 20 is a decision circuit. Only when a set time datum is obtained from the time setting circuit 19, the decision circuit 20 compares this datum with the present time datum of the magnetic tape from the time data decoder 17. If the current time datum is smaller than the set time datum, a fast forward (FF) signal is outputted. If the current time datum is greater than the set time datum, a fast rewind (REW) signal is outputted to a motor drive circuit 21 to drive a motor 22. The decision circuit 20 outputs a stop or normal-speed reproduction signal when these data become equal to each other, causing the motor drive circuit 21 to stop the motor 22 or to start rotating at a normal rate During a normal-speed reproduction in the playback system of FIG. 3, the time setting circuit 19 does not output any time setting datum and the motor drive circuit 21 accordingly causes the motor 22 to rotate at a normal rate. Thus, the playback head 11 reproduces both the primary an secondary signals $D_1$ and $D_2$ and they are sent through the playback amplifier 12 to the shaping circuit 13 and inputted to the demodulation circuit 14 and the time data decoder 17. The primary signal which is inputted to the demodulation circuit 14 is converted back to the original analog audio signal as explained above by passing through the time-axis expansion circuit 15 and the digital decoder circuit 16. The signal which is inputted to the time data decoder 17 (secondary signal=current time datum), on the other hand, is supplied to the display circuit 18 and contributes to the time display indicating the current position of the magnetic tape T.

When it is desired to reproduce a certain portion of the magnetic tape T, if the initial time datum for that portion is set in the time setting circuit 19 and a set time datum indicating that time is outputted from this circuit 19, the record-playback system is put in a high-speed playback condition (REW or FF by the motor drive circuit 21). The decision circuit 20 compares this set time datum and the current time datum obtainable from the time data decoder 17 and if, for example, the former is larger, the REW signal is transmitted and the motor drive circuit 21 is caused to drive the motor 22 for a high-speed rewinding (REW) of the magnetic tape T. During this high-speed rewinding operation, the primary signal recorded at a high density either cannot be reproduced because of problems related to the frequency characteristics of the playback head 16, etc. or may be reproduced but its level will be extremely low. By comparison, the secondary signal recorded at a low density can be reproduced effectively. It passes through the playback amplifier 12, the shaping circuit 13 and the time data decoder 17, and the current time, that is, the current position of the magnetic tape T is displayed continually by the display circuit 18. When the current time datum from the time data decoder 17 coincides with the set time datum, the decision circuit 20 transmits a normal-speed playback signal to the motor drive circuit 21. This causes the motor 22 to rotate and the magnetic tape T to travel at normal rates.

In summary, the present invention records on the same track by time-division both the primary signal such as an audio signal and the secondary signal showing the absolute position of the magnetic tape. Thus, recording can be effected with a small number of magnetic heads and the tracks on a magnetic tape can be more effectively utilized by the present invention.

The present invention has been described above in terms of only one embodiment but many variations and modifications can be made within the spirit of this invention. The scope of this invention is limited only by the following claims.

What is claimed is:

1. A PCM type record-playback system comprising
   a digital encoder circuit adapted to digitize an analog primary signal,
   a blanking period generation circuit adapted to generate blanking periods in a digitized primary signal obtainable from said digital encoder circuit,
   an oscillation circuit adapted to generate a reference clock signal,
   a secondary signal generation circuit adapted to generate a secondary signal on the basis of said reference clock signal for indicating positions on a magnetic tape,
   a signal synthesizing circuit means adapted to input said primary signal with blanking periods from said blanking period generation circuit and said secondary signal from said secondary signal generation circuit and, being driven in a time-divided manner, to output said primary and secondary signals by inserting said secondary signal in said blanking periods of said primary signal, and
   a recording circuit adapted to record a signal from said signal synthesizing circuit means on a track of said magnetic tape,
   said system being adapted to concurrently record on said magnetic tape both said analog primary signal by converting it into a digital signal by sampling and quantizing it and said secondary signal for showing a position on said magnetic tape.

2. The record-playback system of claim 1 wherein said digital encoder circuit also serves to quantize said analog primary signal into a predetermined number of bits.

3. The record-playback system of claim 1 wherein said blanking period generation circuit serves to timewise compress said digitized primary signal.

4. The record-playback system of claim 1 wherein said signal synthesizing circuit means comprises a switch having a first input terminal for receiving said primary signal and a second input terminal for receiving said second signal, said switch being controlled by a switching pulse generator controlled by said blanking period generation circuit.

5. The record-playback system of claim 1 further comprising a playback amplifier for amplifying primary and secondary playback signals, a waveform shaping circuit for receiving said primary and secondary playback signals and outputting them by shaping them into digital playback signals, and a demodulation circuit for demodulating said first playback signals.

6. The record-playback system of claim 5 further comprising a time data decoder for receiving said secondary playback signals.

* * * * *